(12) United States Patent
Zangi

(10) Patent No.: US 7,876,774 B2
(45) Date of Patent: Jan. 25, 2011

(54) CONTENTION BASED RANDOM ACCESS METHOD WITH AUTONOMOUS CARRIER SELECTION

(75) Inventor: Kambiz C. Zangi, Chapel Hill, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1004 days.

(21) Appl. No.: 11/535,653

(22) Filed: Sep. 27, 2006

(65) Prior Publication Data

US 2008/0075109 A1     Mar. 27, 2008

(51) Int. Cl.
*H04L 12/43*    (2006.01)
(52) U.S. Cl. ........................ 370/461; 370/203
(58) Field of Classification Search ............. 370/461, 370/203, 208, 336, 332
See application file for complete search history.

(56) References Cited

U.S. PATENT DOCUMENTS

| | | | | |
|---|---|---|---|---|
| 5,726,978 | A * | 3/1998 | Frodigh et al. | 370/252 |
| 6,081,536 | A * | 6/2000 | Gorsuch et al. | 370/468 |
| 6,628,673 | B1 * | 9/2003 | McFarland et al. | 370/481 |
| 6,628,945 | B1 * | 9/2003 | Koorapaty et al. | 455/434 |
| 2005/0152357 | A1 * | 7/2005 | Stephens | 370/389 |
| 2006/0067415 | A1 | 3/2006 | Mujtaba | |
| 2008/0049708 | A1 * | 2/2008 | Khan et al. | 370/343 |

FOREIGN PATENT DOCUMENTS

WO     2006075042 A1     7/2006

OTHER PUBLICATIONS

M. Tsatsania, R. Zhang, and S. Banerjee, "Network-Assisted Diversity for Random Access Wireless Networks," IEEE Trans. On Signal Processing, vol. 48, No. 3, Mar. 2000, pp. 702-711.

* cited by examiner

*Primary Examiner*—Derrick W Ferris
*Assistant Examiner*—Mang Yeung
(74) *Attorney, Agent, or Firm*—Coats & Bennett, PLLC.

(57) ABSTRACT

A plurality of user terminals shares an uplink channel having a plurality of subcarriers according to a contention based random access protocol. Each user terminal is assigned one or more primary subcarriers, which are reserved for specific user terminals. In addition, a pool of supplemental subcarriers is available for use by any user terminal. When a user terminal sends a data packet, the user terminal transmits at least a first portion of the data packet on its assigned primary subcarriers. If additional subcarriers are needed, the user terminal autonomously selects one or more supplemental subcarriers from the pool to transmit a second portion of the data packet. The access point knows a priori which ones of the user terminals are assigned to each of the primary subcarriers. When a user terminal selects one or more supplemental subcarriers, the user terminals send to subcarrier selection information to the access point.

24 Claims, 6 Drawing Sheets

CONTENTION BASED RANDOM ACCESS METHOD WITH AUTONOMOUS CARRIER SELECTION

BACKGROUND

The present invention relates to multiple access protocols for a wireless communication system and, more particularly, to a contention-based multiple access protocol for an uplink channel having a plurality of subcarriers.

In a wireless packet data network, a plurality of user terminals transmits packet data to an access point over a shared uplink channel. A multiple access protocol is used to share the uplink channel among the user terminals. The random access protocol may be a reservation based protocol or a contention based protocol. In either case, the channel is typically divided in the time domain into a sequence of time slots. The user terminals share the channel by transmitting in different time slots. The channel may also be divided in the frequency domain, as in the case of Orthogonal Frequency Division Multiplexing (OFDM) systems. In such cases, multiple user terminals may transmit in the same timeslot, but on different subcarrier frequencies.

A reservation-based random access protocol reserves resources for individual user terminals. The mobile stations request permission from the access point to transmit on the shared uplink channel. If the request is granted, the access point reserves resources for the user terminal and sends a grant message to the user terminal identifying the reserved resources. The reserved resources may, for example, comprise a timeslot or portion of a timeslot. After receiving permission, the user terminal transmits its data using the allocated resources. One shortcoming of reservation-based multiple access protocols is the delay incurred in the request/grant procedure.

In contention-based multiple access protocol, resources are not reserved and the user terminals compete with one another for access to the channel. One such protocol is called slotted ALOHA. In slotted ALOHA, the shared uplink channel is divided into a sequence of time slots. When a user terminal has packet data to transmit, it selects a time slot and begins its transmission at the start of the selected time slot. With single packet reception, the packet will be received by the access point if no other user terminal transmits in the same slot. However, if another user terminal transmits in the same time slot, a collision occurs and neither packet will be received. In the event of a collision, each user terminal backs off a random amount and retransmits in another time slot. It has been shown that the maximum throughput using slotted ALOHA is 0.36 packets per slot. This low throughput is the main disadvantage of the slotted ALOHA approach.

Multi-packet reception may be used to improve the throughput of the slotted ALOHA approach. With multi-packet reception, the access point employs multi-user detection techniques to detect the transmissions from multiple user terminals in the same time slot. Multi-packet reception may significantly increase the throughput of the slotted ALOHA approach.

One approach to slotted ALOHA with multi-packet reception is disclosed in a co-pending application titled "Arrangement and Method for Contention-Based Multiaccess in a Wireless Communication System." In this application, slotted ALOHA and multi-packet reception are applied to share an uplink channel in an orthogonal frequency division multiplexing (OFDM) system. The uplink channel comprises a plurality of subcarriers. The access point is equipped with multiple receive antennas. There are a plurality of user terminals, each of which has a single antenna. The shared uplink channel is divided into a series of time slots. When a user terminal has packet data to send, the user terminal selects a timeslot and starts transmitting at the beginning of the selected time slot. A slow power control mechanism is employed so that the average power spectral density of the received signals from all user terminals is the same at the access point. The access point reports the noise level to the user terminals, which use the noise level to determine their data transmission rate. Using multi-user detection techniques, the access point is able to demodulate and decode the transmissions from multiple user terminals in a single time slot.

One limitation of the above-described technique is that each user terminal must transmit on the same subcarriers. This limitation avoids ambiguity over which subcarriers to demodulate when receiving signals from multiple user terminals. As long as the access point can detect the identity of the user terminal, the access point can demodulate and decode the signals from multiple user terminals.

It is not always advantageous for mobile terminals to use the same set or number of subcarriers when transmitting on the uplink channel. Packet sizes may vary from one user terminal to another. A user terminal with a small packet does not need as many subcarriers to transmit the packet as compared to a user terminal with a larger packet. Multiple access interference could be reduced if a user terminal could elect to use less than all of the subcarriers to transmit a packet. Additionally, a user terminal with a large path loss may not have sufficient power available to transmit on all subcarriers and maintain the average power spectral density on all subcarriers.

It would be advantageous to have a contention-based multiple access approach that allowed the user terminal to autonomously select the number of subcarriers to use for transmissions on the uplink. Such a system would accommodate a variable data rate, reduce overall interference in the system, and avoid power limitations in circumstances where user terminals have a large path loss.

SUMMARY

An uplink channel having a plurality of subcarriers is shared by a plurality of user terminals according to a contention based random access protocol. Each user terminal is assigned one or more primary subcarriers, which are reserved for specific user terminals. The remaining supplemental subcarriers comprise a common pool that can be used by any user terminal. When a user terminal sends a data packet, the user terminal transmits at least a first portion of the data packet on its assigned primary subcarriers. If additional subcarriers are need, the user terminal autonomously selects one or more supplemental subcarriers from the common pool to transmit a second portion of the data packet. The access point knows a priori which ones of the user terminals are assigned to each of the primary subcarriers. When a user terminal selects one or more supplemental subcarriers, the user terminals sends subcarrier selection information to the access point to identify the selected supplemental subcarriers.

DETAILED DESCRIPTION

Figure 1:
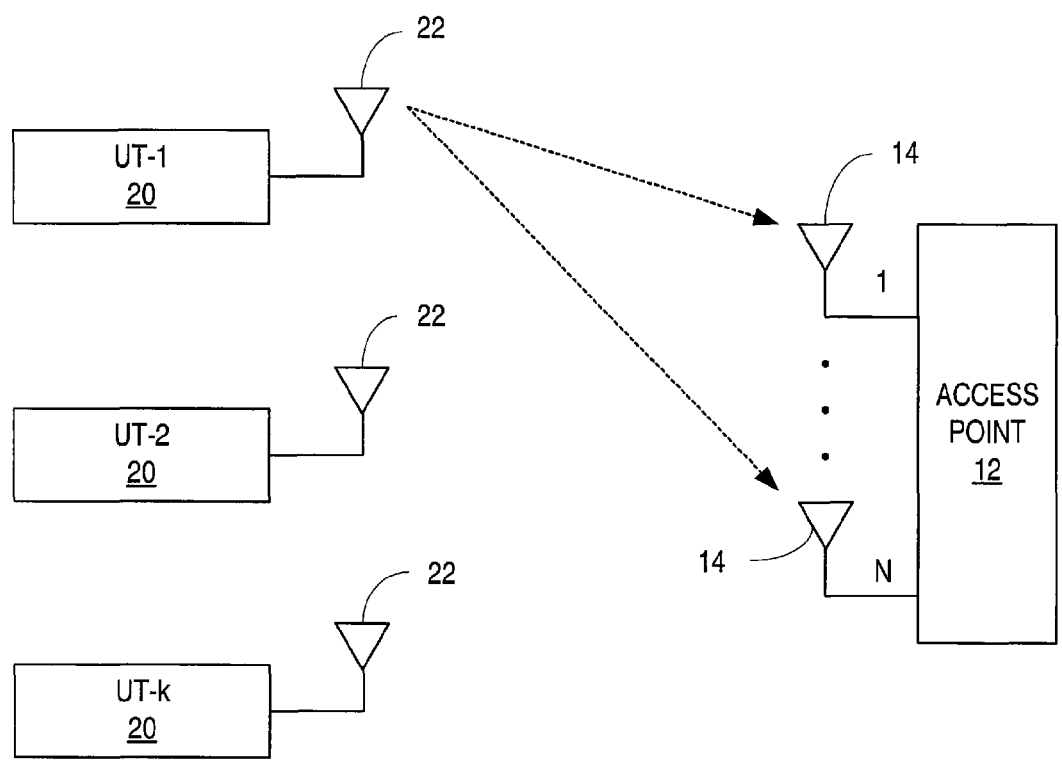
FIG. 1 illustrates an exemplary communication system according to one embodiment.

Referring now to the drawings, the present invention will be described in the context of a shared uplink channel in an orthogonal frequency division multiplexing (OFDM) network 10. Those skilled in the art will appreciate, however, that the present invention may be applied to other communication technologies, such as code division multiple access (CDMA) and time division multiple access (TDMA) systems. As shown in FIG. 1, a plurality of user terminals 20 communicates over a shared uplink channel with an access point 12. The access point 12 has multiple receive antennas 14. Each user terminal 20 has a single transmit antenna 22.

The uplink channel is subdivided in the time domain into a plurality of time slots. As is well known in the art, the OFDM uplink channel is further divided in the frequency domain into a plurality of subcarriers. Data is normally transmitted by a user terminal 20 in a selected time slot and is spread across subcarriers. Access to the shared uplink channel is contention-based. To access the channel, the user terminal 20 simply selects a timeslot and starts transmission its data at the beginning of a time slot. The information transmitted by the user terminal 20 in a time slot is referred to herein as a data packet.

In the exemplary embodiment, the access point 12 employs multi-packet reception (MPR) to receive data packets from multiple user terminals 20 in a signal time slot. Because the access point 12 is equipped with multiple antennas 14, the access point 12 can exploit spatial and multi-user diversity of the user terminals 20 to jointly decode and demodulate data packets that are simultaneously transmitted from multiple user terminals 20. Assuming that each user terminal 20 spreads its data packet over all of the available subcarriers, an access point 12 having N receive antennas 14 could simultaneously demodulate and decode data packets from up to N user terminals 20.

There are numerous reasons why a user terminal 20 may want to use less than all of the available subcarriers to transmit a data packet to the access point 12. For example, the number of subcarriers needed to transmit a data packet will depend on the size of the data packet. A small data packet may require only one or a few subcarriers, while a large data packet may require many or all of the subcarriers. Also, the number of subcarriers may be limited by the available transmit power of the user terminal 20. As noted above, the user terminals 20 are power controlled so that the average power spectral density of the received signals from all user terminals 20 is the same at the access point 12. Consequently, a user terminal 20 that is farther from the access point 12 will use more power to transmit than a user terminal 20 that is close to the access point 12. The power limitation of the user terminal 20 may limit the number of subcarriers that the user terminal 20 can use. The present invention provides a contention based random access method that allows the user terminal 20 to autonomously select the number of subcarriers to use for packet data transmission depending on the amount of data to be sent, power constraints, and possibly other factors.

Figure 2:
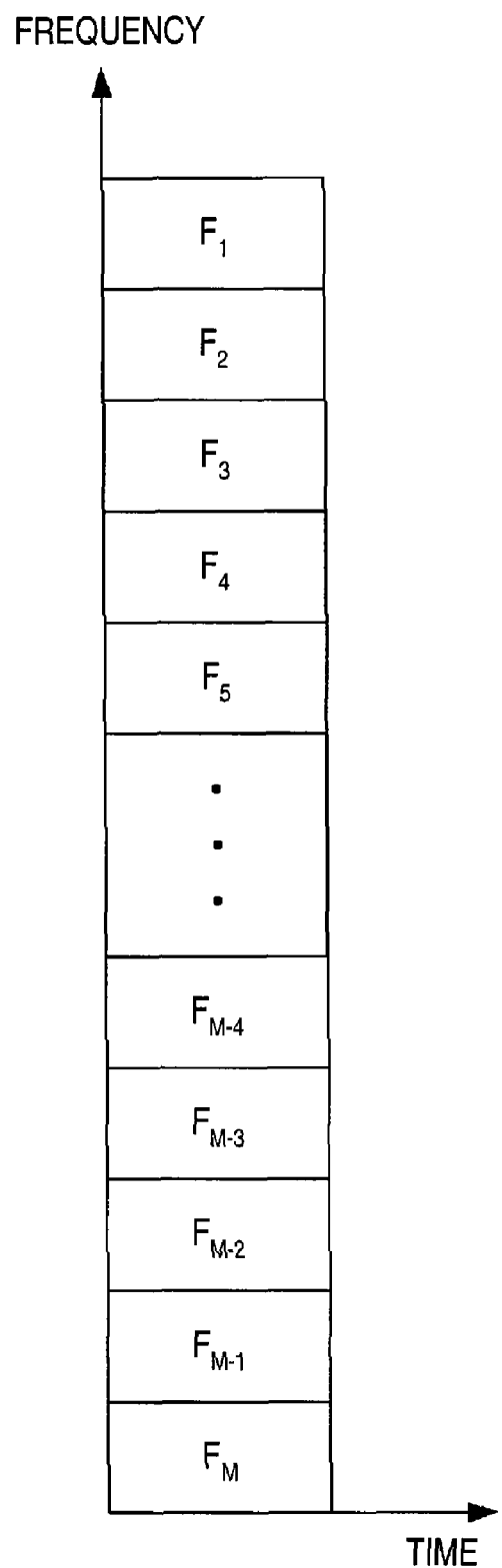
FIG. 2 illustrates an exemplary frequency partitioning of an uplink timeslot.

FIG. 2 illustrates an exemplary contention-based, random access method according to one embodiment of the present invention. FIG. 2 illustrates one time slot of an OFDM carrier that is partitioned in the frequency domain into a plurality of subcarriers. The subcarriers are illustrated in FIG. 2 as vertically-stacked partitions. A first number of the subcarriers are designated as primary subcarriers and a second number are designated as supplemental subcarriers. Use of the primary subcarriers is restricted. Each user terminal 20 is assigned one or more primary subcarriers that can be used only by those user terminals 20 to which the primary subcarrier is assigned. The assignment of user terminals 20 to primary subcarriers may be done by the access point 20. The supplemental subcarriers comprise a common pool of subcarriers that can be used by any user terminal 20.

When a user terminal 20 sends a data packet, it transmits all or part of the data packet on its assigned primary subcarrier. If the user terminal 20 is assigned multiple primary subcarriers, the user terminal 20 spread the data packet across all of its assigned primary subcarriers. If the size of the data packet exceeds the capacity of the primary subcarriers, the user terminal 20 transmits a first part of the data packet on the primary subcarriers and selects one or more supplemental subcarriers as needed to transmit a second part of the data packet. The supplemental carrier selection by the user terminal 20 is autonomous. That is, the user terminal 20 selects from the common pool of subcarriers on its own initiative without requesting permission from the access point. The user terminal 20 may, however, receive information from the access point 12 to aid the user terminal 20 in its selection. However, the decision on the number of subcarriers needed and which subcarriers to ultimately use is made by user terminal 20.

The autonomous selection of supplemental carriers presents a problem for the access point 12. In this case, the header is transmitted to the access point 12 in one or more of the assigned subcarriers to identify any additional subcarriers that may have been used by the user terminal for the transmission. To successively decode and demodulate simultaneously-transmitted data packets from multiple user terminals 20, the access point 12 needs to know the subcarriers used by each user terminal 20. If the access point 12 assigns the user terminals 20 to primary subcarriers, it will have a priori knowledge of the primary subcarriers. However, the user terminals 20 autonomously select the supplemental subcarriers used for packet data transmissions. Therefore, the access point 12 does not know a priori which supplemental subcarriers, if any, a particular user terminal 20 may have used to transmit a data packet. Therefore, the user terminals 20 must inform the access point 12 which supplemental carriers, if any, were used when a data packet is transmitted.

In one exemplary embodiment, the user terminals 20 send subcarrier selection information to the access point 12 on the primary subcarriers. The subcarrier selection information identifies the supplemental subcarriers, if any, that were used by the user terminal 20. The first portion of the data packet may include a header that contains the carrier selection information. If user terminal 20 is assigned more than one primary subcarrier, the header could be repeated on each primary subcarrier to protect the header from frequency selective fading. Alternatively, carrier selection information could be transmitted on a separate control channel.

An advantage of the contention-based access method of the present invention is that more users can share the same channel since the user terminals 20 will not always transmit on all subcarriers. When a user terminal 20 has only a small amount of data to send, the user terminal 20 can transmit data packet in a small fraction of the available subcarriers. The subcarriers not used are then available for other user terminals 20 to use. If the access points 12 can simultaneously detect signals from N user terminals 20 in each subcarrier, the contention-based, random access method of the present invention could accommodate greater than N user terminals 20.

Figure 3:
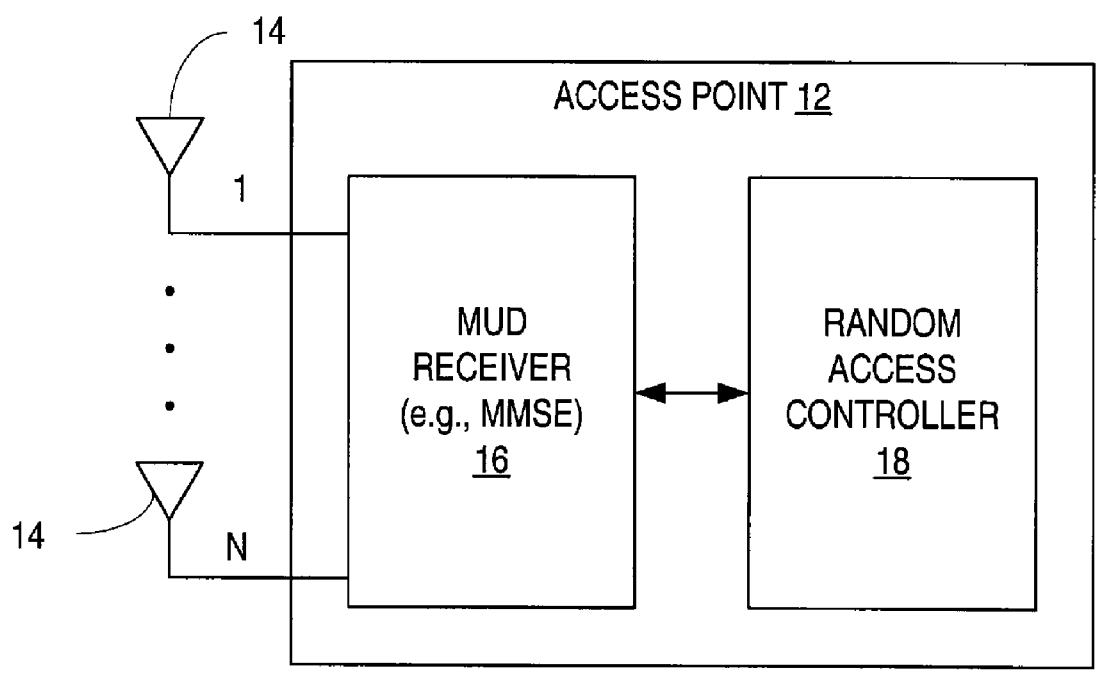
FIG. 3 illustrates an exemplary access point.

FIG. 3 illustrates an exemplary access point 12. As previously noted, access point 12 has multiple receive antennas 14 to receive signals transmitted on the uplink channel from the user terminal 20. Receive antennas 14 are coupled to a multiuser detection (MUD) receiver 16 that jointly detects the signals from the user terminals 20. The MUD receiver 16 may, for example, comprise a minimum means squared error (MMSE) receiver. The receiver 16 decodes and demodulates the receive signals from the user terminal 20. A random access controller 18 assigns subcarriers to the user terminals 20 and provides information about the subcarriers to the receiver 16.

Figure 4:
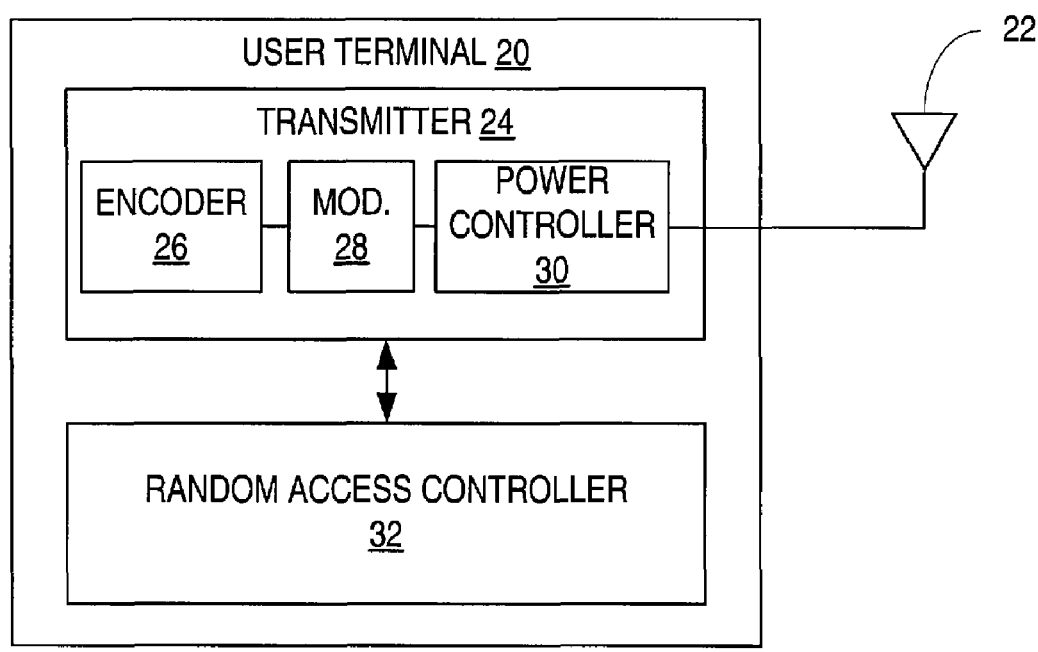
FIG. 4 illustrates an exemplary user terminal.

FIG. 4 illustrates an exemplary user terminal 20. User terminal 20 includes a transmitter 24 coupled to a single transmit antenna 22 and a random access controller 32. The transmitter 24 includes an encoder 26, modulator 28, and power controller 30. Encoder 26 encodes the information bits to enable bit errors to be detected and/or corrected by the access point 12. The coded information bits output by encoder 26 are modulated onto a carrier by modulator 28. As is well known in the art, the OFDM modulator 28 spreads the transmitted information bits across multiple subcarriers. The number of subcarriers N is determined by random access controller 32. The power controller 30 controls the transmit power of the transmitter 24. In the exemplary embodiment, power controller 30 implements a form of slow power control to compensate for path loss and shadowing. The access point 12 determines a target average power spectral density and transmits the target value to user terminal 20 on a downlink control channel. The power controller 30 controls transmit power so that the average power spectral density received by the access point 12 from each user terminal 20 is the same. The slow power control compensates for slow fitting and shadowing. Slow power control does not compensate for fast fading or frequency-selective fading. The power control technique is describe in greater detail in co-pending U.S. patent application Ser. No. 11/531,587 filed Sep. 13, 2006 and titled "Arrangement and Method for Contention-Based Multi-access in a Wireless Communication System," which is incorporated herein by reference.

Figure 5:
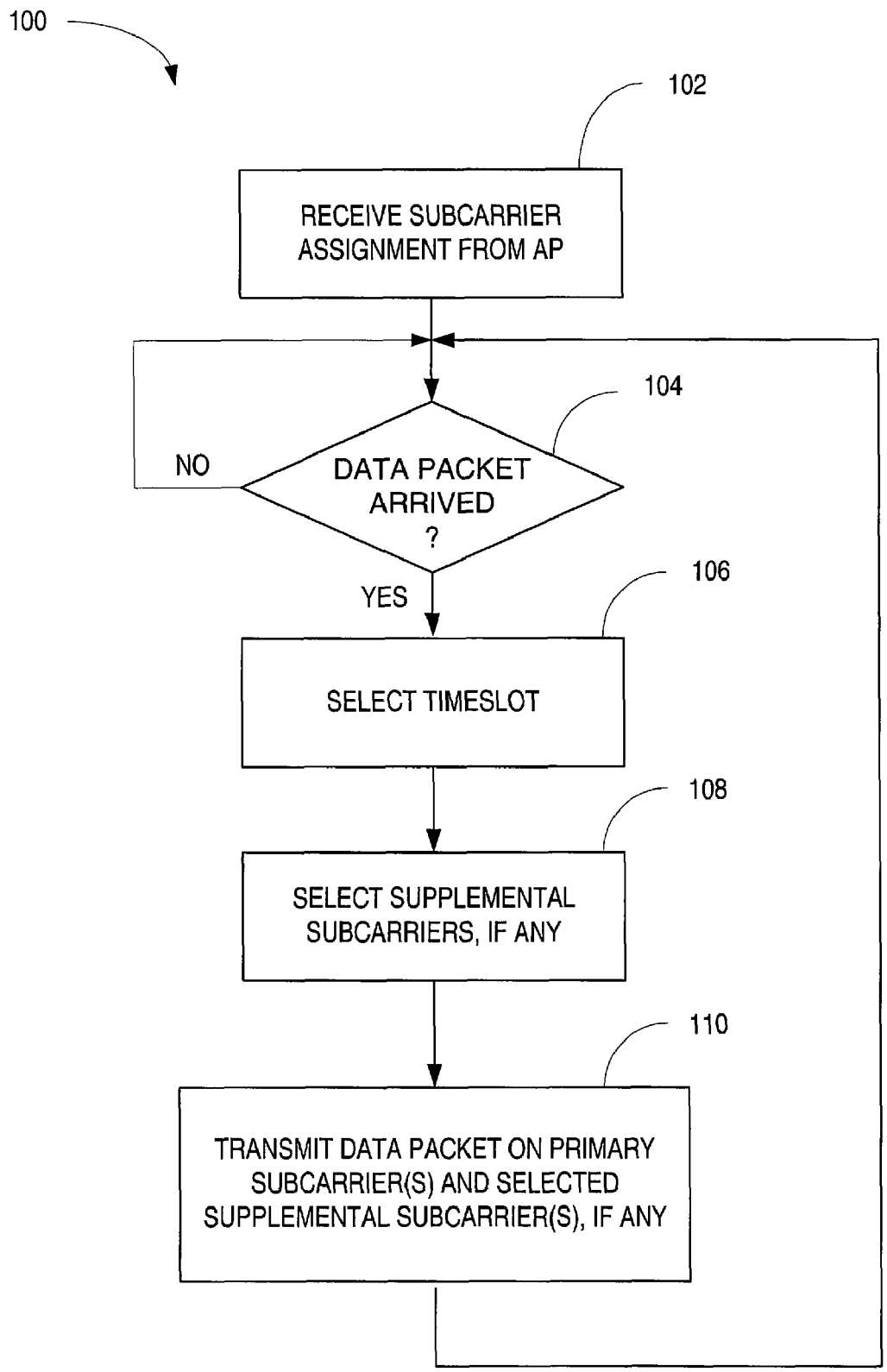
FIG. 5 illustrates an exemplary procedure used by a user terminal for uplink transmissions.

FIG. 5 illustrates an exemplary procedure 100 implemented by a user terminal 20. The user terminal 20 receives a subcarrier assignment from access point 12 assigning the user terminal 20 to one or more primary subcarriers (block 102). The subcarrier assignment is made before data is transmitted. After receiving the subcarrier assignment, the user terminal 20 waits for a data packet to arrive at the transmitter 24 (block 104). When a data packet arrives, the user terminal 20 selects a time slot (block 106) and supplemental subcarriers, if any, needed to transmit the data packet (block 108). In selecting the supplemental subcarriers, the user terminal 20 may maximize the frequency spacing between the supplemental and primary subcarriers. This helps protect against frequency-selective fading. The data packet is then transmitted on the primary subcarrier and selected subcarriers, if any (block 110). Although not shown in the figures, a retransmission protocol may be used as desired to ensure that the data packet is successfully transmitted. For example, access point 12 may be required to acknowledge the transmitted data packets on an acknowledgment channel. If the data packet is not acknowledged within a predetermined time period, the user terminal 20 may select another time slot and repeat the transmission. If desired, user terminal 20 may select different ones of the supplemental subcarriers each time the data packet is retransmitted.

Figure 6:
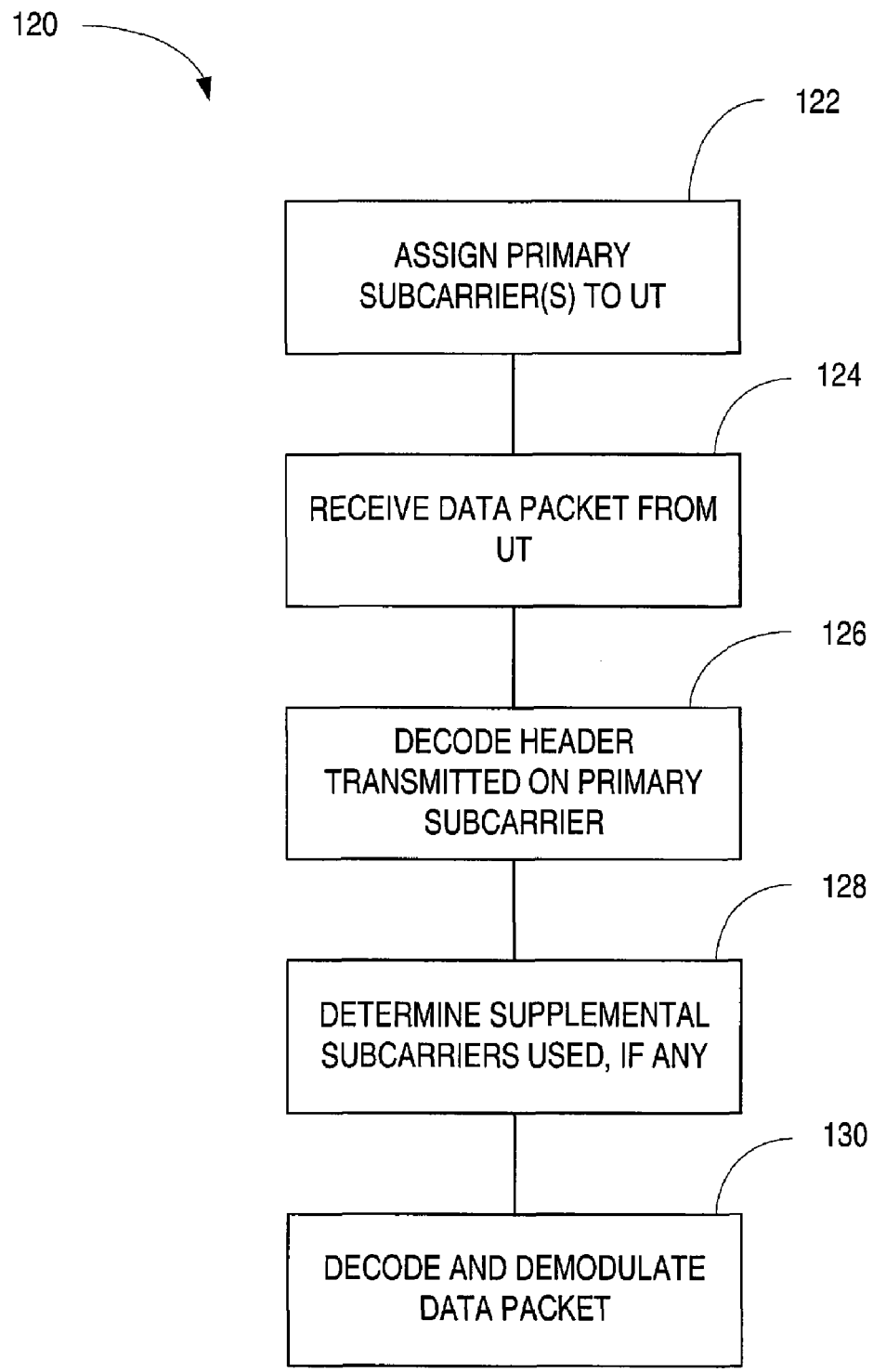
FIG. 6 illustrates an exemplary procedure used by an access point to decode and demodulate a received data packet.

FIG. 6 illustrates an exemplary method 120 implemented by access point 12. The access point 12 assigns one or more primary subcarriers to a user terminal 20 (block 122). Subsequently, access point 12 receives a data packet from the user terminal 20 in an uplink time slot (block 124). The access point 12 decodes the header transmitted on the primary subcarrier assigned to the user terminal 20 (block 126). After decoding the header, the access point 12 determines which supplemental carriers, if any, were used to transmit the data packet (block 128). The access point 12 then decodes and demodulates the data packet (block 130). If desired, access point 12 may be required to acknowledge successful decoding and demodulation of the data packet, though such is not required.

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method of accessing a shared communication channel by a user terminal, said method comprising:
   transmitting a first portion of a data packet from said user terminal to an access point in an uplink timeslot on one or more assigned primary subcarriers assigned to the user terminal by said access point;
   autonomously selecting by said user terminal one or more unassigned supplemental subcarriers in said uplink timeslot for transmission of a second portion of said data packet; and
   transmitting said second portion of said data packet from said user terminal to said access point in said uplink timeslot on said selected supplemental subcarriers.

2. The method of claim 1 further comprising transmitting subcarrier selection information to said access point identifying said selected supplemental subcarriers used for transmitting said second portion of said data packet.

3. The method of claim 2 wherein said subcarrier selection information is transmitted on one or more of said primary subcarriers.

4. The method of claim 3 wherein said subcarrier selection information is contained in a header transmitted on or more of said primary subcarriers.

5. The method of claim 1 wherein selecting said supplemental subcarriers comprises selecting supplemental subcarriers to maximize frequency spacing between the supplemental and primary subcarriers.

6. The method of claim 1 wherein the user terminal transmits on all its assigned primary subcarriers during an access attempt.

7. The method of claim 6 wherein the user terminal transmits on only its assigned primary subcarriers when the capacity of its assigned primary subcarriers is sufficient to transmit the data packet.

8. A user terminal comprising:
   a transmitter for transmitting data packets to an access point on a shared uplink channel having a plurality of subcarriers; and
   a random access controller to control transmissions on said shared uplink channel by said transmitter according to a contention based access protocol, said random access controller configured to:
   use one or more primary subcarriers, assigned to the user terminal by said access point, to transmit a first portion of a data packet to said access point in an uplink timeslot;

autonomously select one or more unassigned supplemental subcarriers as needed for transmission of a second portion of said data packet to said access point in said uplink timeslot; and use the selected supplemental subcarriers to transmit said second portion of said data packet to said access point in said uplink timeslot.

9. The user terminal of claim 8 further wherein the random access controller is further configured to transmit subcarrier selection information to said access point identifying said selected supplemental subcarriers used for transmitting said second portion of said data packet.

10. The user terminal of claim 9 wherein the random access controller is further configured to transmit said subcarrier selection information on one or more of said primary subcarriers.

11. The user terminal of claim 10 wherein the random access controller is further configured to transmit said subcarrier selection information in a header transmitted on or more of said primary subcarriers.

12. The user terminal of claim 8 wherein the random access controller selects said supplemental subcarriers to maximize frequency spacing between the supplemental and primary subcarriers.

13. The user terminal of claim 8 wherein the random access controller is further configured to transmit on all the assigned primary subcarriers during an access attempt.

14. The user terminal of claim 13 wherein the random access controller is further configured to use only the assigned primary subcarriers when the capacity of its assigned primary subcarriers is sufficient to transmit the data packet.

15. A method of receiving a data packet at an access point from a user terminal over a shared uplink channel having a plurality of subcarriers, said method comprising:

assigning at said access point one or more primary subcarriers to said user terminal for transmitting a first portion of the data packet;

receiving a first portion of said data packet in an uplink timeslot on the assigned primary subcarriers assigned to said user terminal;

receiving a second portion of said data packet in said uplink timeslot on one or more unassigned supplemental subcarriers selected autonomously by said user terminal and not known a priori by said access point;

receiving subcarrier selection information from the user terminal identifying the selected supplemental subcarriers; and decoding and demodulating the data packet using the subcarrier selection information.

16. The method of claim 15 wherein said subcarrier selection information is received on one or more of said primary subcarriers.

17. The method of claim 16 wherein said subcarrier selection information is contained in a header transmitted on or more of said primary subcarriers.

18. The method of claim 15 wherein the access point receives on all primary subcarriers assigned to the user terminal during an access attempt.

19. The method of claim 15 wherein the access point receives on only the assigned primary subcarriers when the capacity of its assigned primary subcarriers is sufficient to transmit the data packet.

20. An access point comprising:

a receiver for receiving a data packet from a user terminal in a timeslot of a shared uplink channel having a plurality of subcarriers; and a random access controller configured to:
assign one or more primary subcarriers to said user terminal for transmitting a first portion of the data packet;
identify one or more supplemental subcarriers autonomously selected by the user terminal to transmit a second portion of the data packet; and a demodulation circuit to demodulate and decode said data packet.

21. The access point of claim 20 wherein the subcarrier selection information is received by the access point in the timeslot on one or more of the primary subcarriers.

22. The access point of claim 21 subcarrier selection information is contained in a header transmitted on or more of said primary subcarriers.

23. The access point of claim 20 wherein the access point receives the data packet on all primary subcarriers assigned to the user terminal.

24. The access point of claim 23 wherein the access point receives the data packet on only the assigned primary subcarriers when the capacity of its assigned primary subcarriers is sufficient to transmit the data packet.

* * * * *

UNITED STATES PATENT AND TRADEMARK OFFICE
CERTIFICATE OF CORRECTION

| | | |
|---|---|---|
| PATENT NO. | : 7,876,774 B2 | Page 1 of 1 |
| APPLICATION NO. | : 11/535653 | |
| DATED | : January 25, 2011 | |
| INVENTOR(S) | : Zangi | |

It is certified that error appears in the above-identified patent and that said Letters Patent is hereby corrected as shown below:

In Column 6, Line 44, in Claim 4, delete "on or more" and insert -- on one or more --, therefor.

In Column 7, Line 8, in Claim 9, delete "further wherein" and insert -- wherein --, therefor.

In Column 7, Lines 19-20, in Claim 11, delete "on or more" and insert -- on one or more --, therefor.

In Column 8, Lines 10-11, in Claim 17, delete "on or more" and insert -- on one or more --, therefor.

In Column 8, Line 35, in Claim 22, delete "claim 21 subcarrier" and insert -- claim 21 wherein the subcarrier --, therefor.

In Column 8, Line 36, in Claim 22, delete "on or more" and insert -- on one or more --, therefor.

Signed and Sealed this
Second Day of August, 2011

David J. Kappos
*Director of the United States Patent and Trademark Office*